US006318765B1

(12) United States Patent
Slais et al.

(10) Patent No.: US 6,318,765 B1
(45) Date of Patent: Nov. 20, 2001

(54) SERVICEABLE MOUNTING DEVICE FOR CONDUIT

(75) Inventors: Robert J. Slais, West Bloomfield; Jerry H. Chisnell, Northville, both of MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/430,575

(22) Filed: Oct. 29, 1999

(51) Int. Cl.$^7$ .................................................. F16L 37/00
(52) U.S. Cl. ......................... 285/305; 285/336; 285/382
(58) Field of Search .............................. 285/305, 124.1, 285/124.3, 124.5, 382, 330, FOR 118

(56) References Cited

U.S. PATENT DOCUMENTS

| | | |
|---|---|---|
| 706,974 | 8/1902 | Lyle . |
| 981,802 | 1/1911 | Shufflebottom et al. . |
| 1,069,937 | 8/1913 | Goehst et al. . |
| 2,534,690 | 12/1950 | Young, Jr. et al. . |
| 2,577,120 | 12/1951 | Franz . |
| 2,846,246 | 8/1958 | Peras . |
| 3,142,358 | 7/1964 | Woerheide, Jr. . |
| 3,190,602 | 6/1965 | Reilly et al. . |
| 3,280,746 | 10/1966 | Broske . |
| 3,290,746 | 12/1966 | Broske . |
| 3,374,014 | 3/1968 | Kull et al. . |
| 3,572,778 | 3/1971 | Cassel . |
| 3,869,152 | 3/1975 | DeVincent et al. . |
| 3,869,153 | 3/1975 | DeVincent et al. . |
| 3,894,706 | 7/1975 | Mizusawa . |
| 3,913,954 * | 10/1975 | Klimpl ................................ 285/305 |
| 3,929,356 | 12/1975 | DeVincent et al. . |
| 4,320,608 | 3/1982 | Deike . |
| 4,400,992 | 8/1983 | Londres . |
| 4,468,054 | 8/1984 | Orth . |
| 4,488,742 | 12/1984 | Schopper et al. . |
| 4,619,545 | 10/1986 | Küttenbaum . |
| 4,693,767 | 9/1987 | Grzanna et al. . |
| 4,759,462 | 7/1988 | Neglio . |
| 4,826,114 | 5/1989 | Umehara . |
| 4,830,121 | 5/1989 | Krasnov et al. . |
| 4,863,203 * | 9/1989 | Mitchell, Jr. .......................... 285/305 |
| 5,071,172 | 12/1991 | Gross . |
| 5,078,432 | 1/1992 | Seiter . |
| 5,219,185 | 6/1993 | Oddenino . |
| 5,234,185 | 8/1993 | Hoffman et al. . |

(List continued on next page.)

FOREIGN PATENT DOCUMENTS

| | | | |
|---|---|---|---|
| 0 481 871 A1 | 10/1991 | (EP) . | |
| 0140352 | 3/1920 | (GB) . | |
| 0167134 | 3/1922 | (GB) . | |
| 0328056 | 4/1930 | (GB) . | |
| 2250078-A * | 5/1992 | (GB) ............................ | 285/FOR 118 |
| 593353-A1 * | 4/1994 | (GB) ............................ | 285/FOR 118 |

*Primary Examiner*—Lynne H. Browne
*Assistant Examiner*—Aaron Dunwoody
(74) *Attorney, Agent, or Firm*—Vanophem & Vanophem, P.C.

(57) ABSTRACT

A conduit mounting device for entrapping a conduit that includes a body having a U-shaped channel formed longitudinally through the body. The U-shaped channel receives the conduit therethrough and defines a leg on either side of the U-shaped channel. A retainer insert is mounted transversely in the U-shaped channel to sandwich the conduit between the retainer insert and the body in the U-shaped channel. The legs of the body are folded behind the retainer insert in the U-shaped channel to transversely entrap the retainer insert and conduit in the U-shaped channel. A device for further longitudinally retaining the retainer insert within the U-shaped channel, in addition to a device for rotatably locking the conduit within the U-shaped channel, may also be provided.

18 Claims, 3 Drawing Sheets

U.S. PATENT DOCUMENTS

| | | |
|---|---|---|
| 5,271,588 | 12/1993 | Doyle . |
| 5,370,344 | 12/1994 | Nadherny . |
| 5,380,326 | 1/1995 | Lin . |
| 5,593,279 * | 1/1997 | Hayashi ............................... 285/330 |
| 5,860,681 | 1/1999 | Slais . |
| 5,992,902 * | 11/1999 | Knapp ................................ 285/305 |

* cited by examiner

SERVICEABLE MOUNTING DEVICE FOR CONDUIT

BACKGROUND OF THE INVENTION

1. Field of the Invention

The present invention generally relates to a device for mounting conduit. More specifically, this invention relates to a conduit mounting device used for connecting conduit of an air-conditioning system to a port associated with another component such as a compressor or another mounting device.

2. Description of the Prior Art

Prior to the present invention, many types of conduit mounting devices were developed for connecting a conduit to another component. For example, it is well known in the art to connect air-conditioning (a/c) tubes to an inlet or discharge port of an a/c component. Such mountings are typically made by means of a male-female coaxially threaded tube coupling or may be fixed within a block by a brazing process. Male-female coaxially threaded tube couplings are impractical for high volume manufacturing since they typically require manual assembly with multiple wrenches. Also, brazing processes typically involve expensive braze material, high temperature conditions, and undesirable fumes. Therefore several alternative approaches have been developed, including entrapping a tube within a block using formed tube features or entrapping a tube within a block using a retainer insert. However, the following approaches have many structural problems.

For example, U.S. Pat. No. 2,534,690 to Young, Jr., et al. discloses a tube longitudinally received into a U-shaped recess of a housing where a retainer clip is then inserted transversely into the same U-shaped recess to sandwich the tube therein. The retainer clip has bent tangs that engage longitudinally machined grooves in the U-shaped recess to lock the retainer clip transversely in place. The retainer clip further has bent flanges that straddle the longitudinal sides of the housing to lock the retainer clip longitudinally in place. Unfortunately, the longitudinally machined grooves in the housing require an expensive machining step, and further the retainer clip is a relatively convoluted and detailed stamping that is prone to tangling with other retainer clips during handling.

Another approach, U.S. Pat. No. 3,929,356 to DeVincent et al. teaches that an upset bead on the end of a tube is received into a stepped bore opening of a connecting block and then a spring retainer clip is removably inserted in a transverse slot from a position out of interference engagement with the annular bead on the tube to a position in which it engages the opposite side of the bead. The spring retainer clip is again a convoluted stamping with bent fingers, buttons, and seats that must fit into an expensive machined groove in the connecting block.

Similarly, U.S. Pat. No. 3,869,153 to DeVincent et al. proposes a tube mounting assembly in which an end of a tube having an upset bead is sandwiched between a mounting plate and a centrally apertured yoke on the tube that encircles the end thereof. The mounting plate is slotted to receive the tube and the yoke has spaced apart legs clamped around the side edges of the mounting plate to secure the tube. The '153 reference further discloses that each yoke is welded or brazed to the upset bead of the tube with which it is associated in order to effect a fluid-tight seal between the elements and to prevent axial or rotative movement of the yoke relative to the tube. Thus, the '153 reference requires the welding of parts and adds significantly more weight.

Finally, U.S. Pat. No. 5,860,681 to Slais teaches a tube received into a U-shaped recess of a block where a retainer insert is then inserted longitudinally into the same U-shaped recess to sandwich the tube therein. The retainer insert has straight tabs that engage longitudinally machined grooves in the U-shaped recess to lock the retainer insert transversely in place and thereby lock the tube in place. Further, the insert has a projection that engages a depression in the tube to prevent rotational movement. Although the retainer insert is a relatively simple molded part, the block includes expensive machined grooves and is relatively thick and heavy in order to accommodate the relatively long groove length needed for sufficient engagement. Furthermore, assembly of the retainer insert can be extremely difficult to perform by hand. The retainer insert must be assembled colinearly over the tube in an extremely tight fit therewith. Thus, the insert tends to bind with the tube during assembly.

All of the above references involve serious manufacturing drawbacks. Machining grooves in a solid block of metal is a relatively slow process that involves expensive cutting machines and tools and waste of material in machining chips. Further, most of the above references involve a convoluted metal stamping to retain the conduit to the block or housing. Such metal stampings are typically prone to tangling in material handling steps and also involve expensive die stamping processes. Although a metal stamped insert is not required in Slais, the insert nonetheless can be very difficult to assemble. Also, the Young, Jr. et al. reference and DeVincent et al. '356 reference involve means for retaining the tube that are not only complicated but also do not allow for preventing rotational movement of the tube within the mounting.

From the above it is clear that there is a need to provide a conduit mounting device that involves less complicated manufacturing processes, provides means for rotatably locking the conduit within the mounting assembly, and is easier to assemble than mountings of the prior art.

SUMMARY OF THE INVENTION

According to the present invention there is provided a device that satisfies the need to provide a conduit mounting device that is easier to manufacture, has an anti-rotation feature, and is easier to assemble than the prior art. Therefore, a conduit mounting device for entrapping a conduit is presented and includes a body having a U-shaped channel formed longitudinally through the body. The U-shaped channel receives the conduit therethrough and defines a transversely extending leg on either side of the U-shaped channel. A retainer insert is mounted transversely in the U-shaped channel to sandwich the conduit between the retainer insert and the body in the U-shaped channel. Finally, the legs of the body are folded behind the retainer insert in the U-shaped channel to transversely entrap the retainer insert and conduit in the U-shaped channel.

Additionally, there are means for longitudinally retaining the retainer insert within the U-shaped channel such as tabs on the retainer insert that mesh with transverse grooves in the legs. Also, there are means for rotatably locking the conduit within the U-shaped channel, such as a projection on the retainer insert that interlocks with a depression in the conduit.

Accordingly, it is an object of the present invention to provide a conduit mounting device having simple features that is easy to manufacture by relatively inexpensive forming techniques such as stamping or molding.

It is another object to provide a conduit mounting device that is easier to assemble, manually and automatically, than mounting devices of the prior art.

It is yet another object to provide a conduit mounting device that may accommodate multiple conduits in a unitary body.

It is still another object to provide a conduit mounting device that is adaptable to male conduit connections or female conduit connections.

It is a further object to provide a conduit mounting device that is capable of preventing or permitting rotation of conduit within a mounting body.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
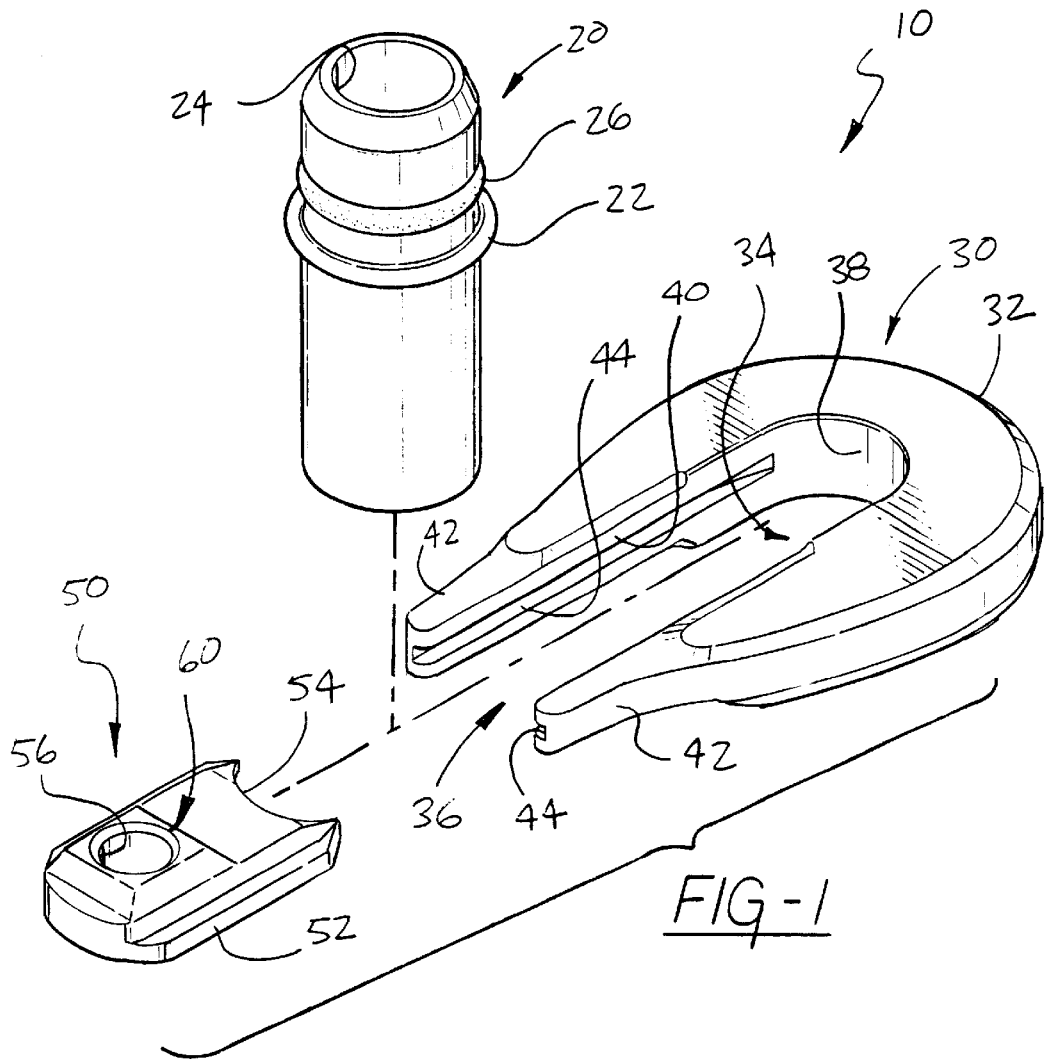
FIG. 1 is an exploded perspective view of a conduit mounting device of the present invention.

Referring to FIG. 1 there is shown in exploded perspective view a conduit mounting device 10 for use with an air-conditioning (a/c) system in an automobile for connecting a conduit 20 to another a/c component. However, as should be understood by one skilled in the art, the present invention is not limited to use in automobile a/c systems. The present invention is usable anywhere a conduit 20 is being connected to any another component. The term conduit 20 refers to any equivalent means for carrying a medium such as fluid, gas, wires, or the like. The conduit mounting device 10 of the present invention includes the conduit 20 mounted within a body or mounting flange 30 and entrapped therein by a retainer insert 50.

The mounting flange 30 of FIG. 1 is a substantially C-shaped body and serves as a means for receiving the conduit 20 longitudinally therethrough. The mounting flange 30 has a U-shaped channel 34 extending longitudinally therethrough and parallel to the longitudinal axis of the conduit 20. The U-shaped channel 34 defines an open end 36 in the mounting flange 30 that is transversely opposed to a closed end 32. The U-shaped channel 34 further defines a semi-cylindrical portion 38 extending longitudinally through the mounting flange 30 and a straight, slotted passage 40 also extending longitudinally through the mounting flange 30. The slotted passage 40 extends across the mounting flange 30 transverse to the longitude of the U-shaped channel 34, from the semi-cylindrical portion 38 to the open end 36. The slotted passage 40 defines a leg 42 on either side of the U-shaped channel 34 where each leg 42 extends transverse to the longitudinal axis of the mounting flange 30. Finally, the mounting flange 30 preferably has a groove 44 formed in each leg 42 that extends transversely along each leg 42 inside the U-shaped channel 34. Preferably, all features of the mounting flange are manufactured using simple forming techniques, such as stamping or molding. Further the mounting flange 30 is preferably formed from aluminum but may be made from any appropriate material by any appropriate process.

The conduit 20 is preferably thin walled and of uniform thickness and is provided at one end thereof with an upset bead 22, as is well known in the art. However, the upset bead 22 need not be provided for the inventive concepts to apply. The conduit 20 is preferably formed from aluminum, but may be made of any other appropriate material and manufactured by any known process. The upset bead 22 is spaced a predetermined distance from an end 24 of the conduit 20 to provide a pilot portion for entry into the U-shaped channel 34. An O-ring 26 for providing a fluid-tight seal is positioned to encircle the pilot portion between the upset bead 22 and the end 24 of the conduit 20.

During the fabrication of the conduit mounting device 10, typically a mounting block (not shown) is fabricated in a process separate from the conduit 20. In some installations the conduit 20 must be bent into intricate forms in order to fit the specific routings of a given automobile. Typically the mounting block must be mounted to the conduit before the bending operation. Here, however, the U-shaped channel 34 is provided in the mounting flange 30 in order to enable positioning the mounting flange 30 subsequent to conduit 20 bending operations. This enables a manufacturer the flexibility and control to position the mounting flange 30 in an exact relationship with the bends in the conduit 20.

Still referring to FIG. 1, the retainer insert 50 for securing the conduit 20 within the U-shaped channel 34 is shown. According to the present invention, the same retainer insert 50 may be used to secure different size diameter conduits 20 within different sized passages. It is necessary to provide a means for longitudinally retaining the retainer insert 50 within the U-shaped channel 34. Therefore, the retainer insert 50 preferably has tabs 52 for engagement in the grooves 44 of the mounting flange 30. Additionally, the legs 42 may be crimped over top of the retainer insert 50 to further retain the retainer insert 50 longitudinally within the U-shaped channel 34. Also, it may be desirable to allow the conduit 20 to pivot freely and thus an arcuate end form 54 for engagement with the conduit 20 diameter is provided.

Figure 7:
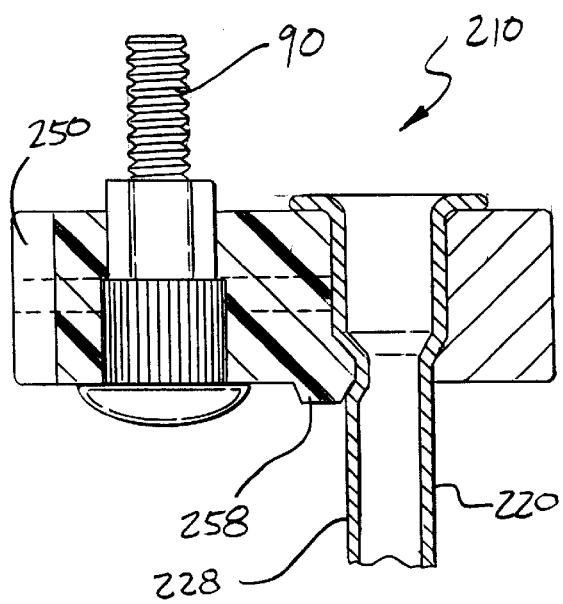
FIG. 7 is a cross-sectional view of an alternate embodiment of the present invention illustrating a retainer insert having a projection offset from centerline.

Moreover, the retainer insert 50 has a fastener passage 56 longitudinally therethrough. The fastener passage 56 receives a fastener 90 (as shown in FIG. 7) for fastening the conduit mounting device 10 to another a/c component (not shown). The fastener passage 56 defines a thin rim portion 60 on opposite longitudinal sides of the retainer insert 50. This thin rim portion 60 permits longitudinal crush down of the retainer insert 50 to meet the height of the upset bead 22. This stabilizes the conduit mounting device 10 squarely to a corresponding mounting surface of another a/c component (not shown). This crush down feature helps adjust for tolerance variation in the thickness of the upset bead 22. The retainer insert 50 is preferably made of a synthetic material such as nylon and is therefore preferably made in a rapid injection molding process. However, it is possible to make the retainer insert 50 using any known material and process without departing from the scope of the present invention.

Figure 2:
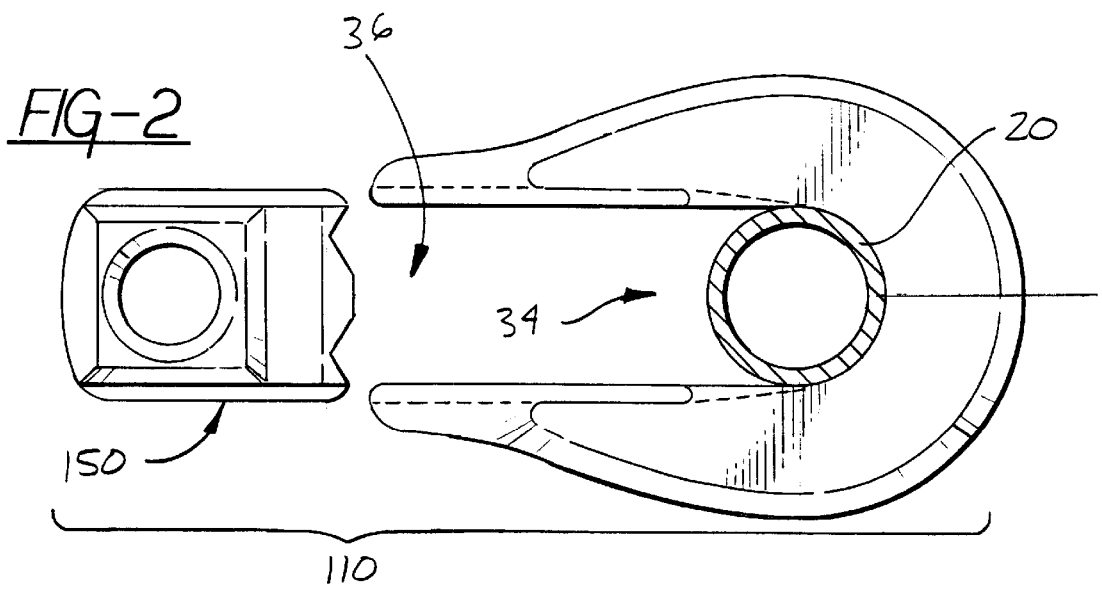
FIG. 2 is a top, partially exploded view of a conduit mounting device according to the present invention illustrating a mounting flange and a retainer insert with a projection for engagement with a conduit.
Figure 3:
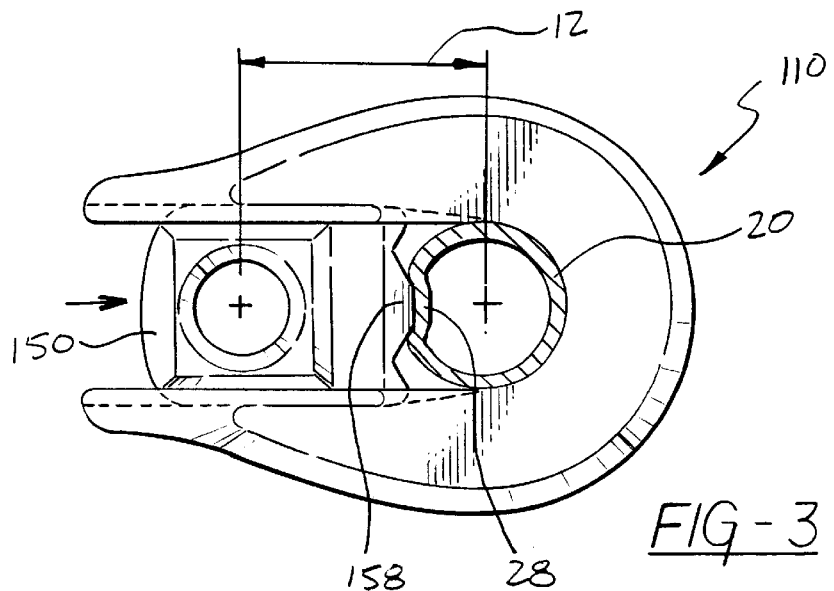
FIG. 3 is a top view of the conduit mounting device of FIG. 2 as yet incomplete and illustrating the projection of the insert in engagement with a depression on the conduit.
Figure 4:
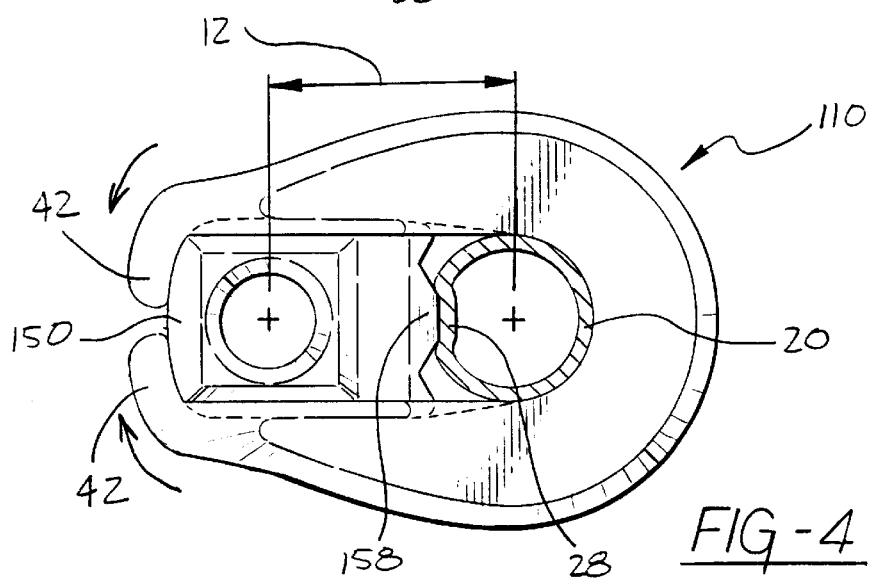
FIG. 4 is a top view of the conduit mounting device of FIG. 3 as complete and illustrating the structure of transversely retaining the insert to the mounting flange.

FIG. 2 illustrates how a conduit mounting device 110 is assembled. First, the conduit 20 is introduced through the U-shaped channel 34, then a retainer insert 150 is inserted transversely into the open end 36 of the U-shaped channel 34. FIG. 3 illustrates that the retainer insert 150 is transversely advanced toward the conduit 20 until a predetermined center distance 12 is achieved. FIG. 4 illustrates how the retainer insert 150 is transversely retained within the U-shaped channel 34. Here, at least one of the legs 42 is bent behind the retainer insert 150 to maintain the center distance 12.

Figure 5:
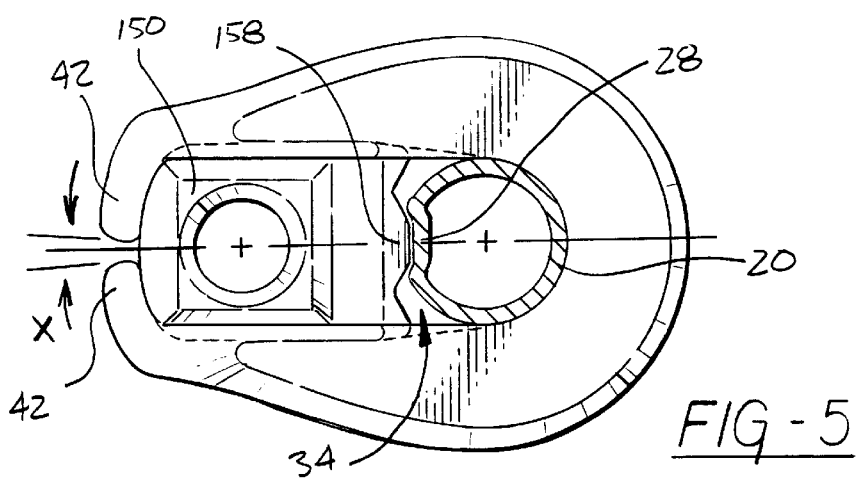
FIG. 5 is a top view of a conduit mounting device according to the preferred embodiment of the present invention illustrating a gap between a projection on the insert and a depression in the conduit.
Figure 6:
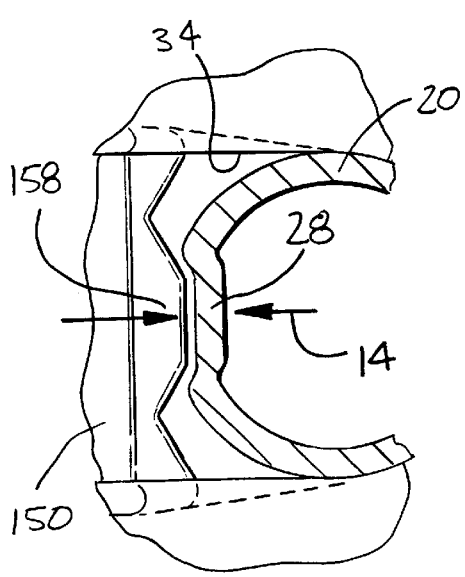
FIG. 6 is an enlarged cutaway view of a portion of the conduit mounting device of FIG. 5, better illustrating the gap.

FIGS. 3 and 4 illustrate that it is preferred that a means for rotatably locking the conduit is provided. For example, during assembly a projection 158 on the retainer insert 150 deforms the conduit 20 thus forming a depression 28 therein. Alternatively, the depression 28 may be preformed in the conduit 20. The projection 158 thereafter remains in interlocking engagement with the depression 28, thereby retaining the conduit 20 within the conduit mounting device 110—longitudinally, transversely, and rotatably. The retainer insert 150 may have different features on opposite sides. For example, any given retainer insert 150 may have a projection 158 on one side and an arcuate end form 54 (as shown in FIG. 1) to allow for application flexibility. It is further preferred that means for permitting the conduit 20 to pivot X degrees is provided, as shown in FIG. 5. For example, FIG. 6 illustrates that a gap 14 may be defined between the projection 158 and the depression 28 to pivotably retain the conduit 20 within the U-shaped channel 34. The gap 14 is maintained by backing the retainer insert 150 a calculated amount after the depression 28 is formed and then locking the retainer insert 150 in place using the legs 42 shown in FIG. 5.

FIG. 7 is a cross-section of an alternate embodiment of the present invention illustrating a female mounting device 210. Here a retainer 250 has an offset projection 258 that engages a depression 228 in a female conduit member 220.

Figure 8:
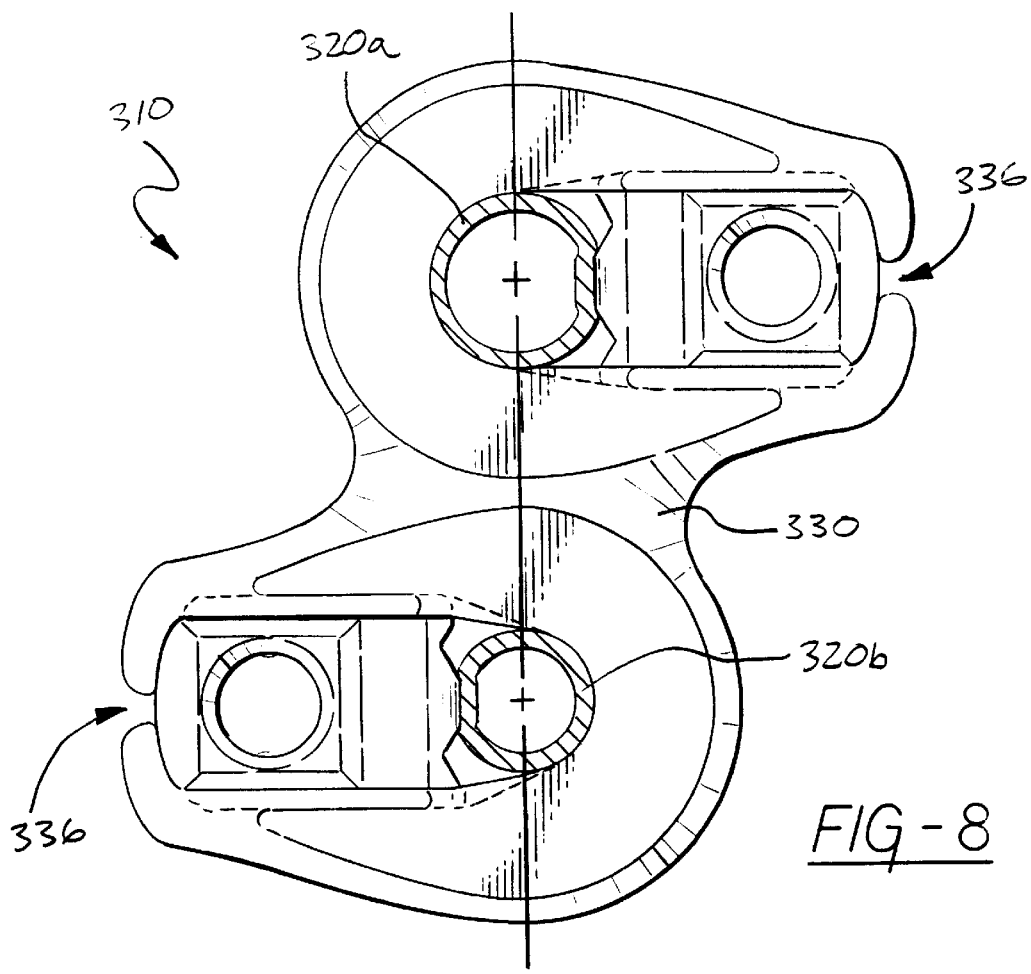
FIG. 8 is a top view of an alternate embodiment of the present invention showing a unitary multiple conduit mounting device.

Finally, FIG. 8 is a top view of another alternate embodiment of the present invention illustrating a multiple conduit mounting device 310. Here, multiple conduit consisting of a suction line 320a and a liquid line 320b are retained in a unitary mounting flange 330. As shown, the open ends 336 of the mounting flange 330 are on opposite sides, but any orientation is contemplated to enable design for unique applications.

From the above, it is apparent that a significant advantage of the present invention is that the mounting flange is very serviceable. During installation it becomes necessary to reorient the conduit to properly install the conduit and account for variations in manufacturing tolerances between the conduit and other vehicle structures. With the present invention, it is very simple to remove the retainer insert and reorient the conduit to overcome these variations with a minimal amount of effort. Furthermore, the insert is very easy to install and remove from the conduit mounting device because it is transverse to the conduit and therefore does not bind with the conduit like some of the prior art. Hence, the present invention allows for easy reorientation of the conduit during service.

Another advantage is that the present invention involves relatively easy manufacturing and assembly processes. For example, the mounting flange may be produced by injection molding, stamping, or casting all the required features in one step. Furthermore, the insert is of salient construction and therefore will not have the tendency to tangle during mass handling like the convoluted construction of some of the prior art inserts. The mounting flange may either be mounted to the conduit prior to or during conduit bending operations or after such bending operations to better ensure the correct relationship therebetween. Finally, assembly of the insert to the mounting flange may easily be performed by hand or automatic machine.

Yet another advantage is that the present invention provides at least three different structures for maintaining position of the conduit. First, the conduit may be left free to rotate within the mounting flange by not engaging the insert and conduit. Second, means for rotatably locking the conduit within the mounting flange may be provided. Third, means for permitting the conduit to pivot slightly may also be provided. Means for permitting the conduit to pivot slightly will provide enough slack in the conduit mounting device so as to resist side loading of the conduit within another a/c component upon assembly.

While the present invention has been described in terms of a preferred embodiment, it is apparent that other forms could be adopted by one skilled in the art. For example, the means for rotatably locking the conduit could instead include a projection on the mounting flange interlocking with a depression in the conduit. Accordingly, the scope of the present invention is to be limited only by the following claims.

What is claimed is:

1. A conduit mounting device for entrapping a conduit, said conduit mounting device comprising:
   a body having a U-shaped channel extending longitudinally therethrough for receiving said conduit longitudinally therethrough, said body further comprising a leg on either side of said U-shaped channel; and
   a retainer insert mounted in said U-shaped channel of said body, such that said conduit is sandwiched between said retainer insert and said body within said U-shaped channel, said legs of said body being folded behind said retainer insert to transversely entrap said retainer insert and said conduit in said U-shaped channel.

2. The conduit mounting device as claimed in claim 1, further comprising:
   means for longitudinally retaining said retainer insert within said U-shaped channel of said body.

3. The conduit mounting device as claimed in claim 2, wherein said longitudinal retaining means comprises at least one transversely extending groove in at least one of said legs of said body, said retainer insert having at least one transversely extending tab interlocking with said at least one transversely extending groove of said body so that said retainer insert is longitudinally retained relative to said body.

4. The conduit mounting device as claimed in claim 2, wherein said longitudinal retaining means includes said legs being crimped over said retainer insert so as to further retain said retainer insert longitudinally within said U-shaped channel.

5. The conduit mounting device as claimed in claim 1, further comprising:
   means for rotatably locking said conduit within said U-shaped channel of said body.

6. The conduit mounting device as claimed in claim 5, wherein said means for rotatably locking includes said conduit having a depression therein, said retainer insert having a projection thereon, said projection interlocking with said depression to rotatably lock said conduit relative to said retainer insert and said body.

7. The conduit mounting device as claimed in claim 6, wherein said projection interlocking with said depression defines a gap therebetween such that said conduit may rotate between 0° and 18° to permit compliant torquedown of said conduit mounting device without side-loading said conduit.

8. The conduit mounting device as claimed in claim 1, wherein said retainer insert includes a fastener passage for accepting a fastener longitudinally therethrough.

9. The conduit mounting device as claimed in claim 8, wherein said fastener passage defines a thin rim portion on either longitudinal side of said retainer insert to enable gradual crushdown of said thin rim portion and to provide more compliant mounting of said conduit mounting device.

10. The conduit mounting device as claimed in claim 1, wherein said body further comprises a plurality of U-shaped channels extending therethrough and a plurality of conduits respectively extending through said plurality of U-shaped channels.

11. A conduit mounting device for entrapping a conduit, said conduit mounting device comprising:

a body having a closed end, said body further having a U-shaped channel extending longitudinally therethrough and defining an open end opposite said closed end, said U-shaped channel further defining a pair of legs, each leg disposed on either side of said U-shaped channel and projecting transversely from the longitudinal axis of said U-shaped channel; and a retainer insert mounted within said U-shaped channel transversely to the longitudinal axis of said U-shaped channel such that said conduit is sandwiched between said retainer insert and said body within said U-shaped channel, said retainer insert having a fastener passage therethrough parallel to the longitudinal axis of said U-shaped channel, said legs of said body being folded behind said retainer insert to transversely entrap said retainer insert and said conduit in said U-shaped channel.

12. The conduit mounting device as claimed in claim 11, further comprising:

means for longitudinally retaining said retainer insert within said U-shaped channel of said body.

13. The conduit mounting device as claimed in claim 11, further comprising:

means for rotatably locking said conduit within said U-shaped channel of said body.

14. The conduit mounting device as claimed in claim 11, wherein said body further comprises a plurality of U-shaped channels extending therethrough and a plurality of conduits respectively extending through said plurality of U-shaped channels.

15. A conduit mounting device for entrapping a conduit, said conduit mounting device comprising:

a body having a U-shaped channel extending longitudinally therethrough and defining an open end of said body, said U-shaped channel further defining a semi-cylindrical portion and a slotted portion extending transversely from said semi-cylindrical portion to said open end, said body further comprising legs on either side of said U-shaped channel and projecting transversely from the longitudinal axis of said U-shaped channel;

a retainer insert mounted within said U-shaped channel transversely to the longitudinal axis of said U-shaped channel such that said conduit is sandwiched between said retainer insert and said body within said U-shaped channel, said retainer insert having a fastener passage therethrough for receiving a fastener, said fastener passage being parallel to the longitudinal axis of said U-shaped channel, said legs of said body being folded behind said retainer insert to transversely entrap said retainer insert and said conduit in said U-shaped channel; and means for longitudinally interlocking said retainer insert within said U-shaped channel of said body.

16. The conduit mounting device as claimed in claim 15, further comprising:

means for longitudinally retaining said retainer insert within said U-shaped channel of said body.

17. The conduit mounting device as claimed in claim 15, further comprising:

means for rotatably locking said conduit within said U-shaped channel of said body.

18. The conduit mounting device as claimed in claim 15, wherein said body further comprises a plurality of U-shaped channels extending therethrough and a plurality of conduits respectively extending through said plurality of U-shaped channels.

* * * * *